United States Patent [19]

Giglia

[11] Patent Number: 4,648,902
[45] Date of Patent: Mar. 10, 1987

[54] REINFORCED METAL SUBSTRATE

[75] Inventor: Robert D. Giglia, Rye, N.Y.

[73] Assignee: American Cyanamid Company, Stamford, Conn.

[21] Appl. No.: 544,306

[22] Filed: Oct. 21, 1983

Related U.S. Application Data

[63] Continuation-in-part of Ser. No. 531,364, Sep. 9, 1983, abandoned.

[51] Int. Cl.$^4$ .......................... C22C 1/04; C22C 1/08; C22C 5/06; C22C 33/02
[52] U.S. Cl. ........................ 75/229; 75/237; 75/243; 419/24; 419/11; 419/26; 419/44; 429/235
[58] Field of Search ................ 419/24, 11, 26, 40, 419/32; 427/397.8; 429/351, 352, 347; 75/229, 230, 237, 243

[56] References Cited

U.S. PATENT DOCUMENTS

| 2,687,447 | 8/1954 | Merrill | 429/251 |
| 2,734,095 | 2/1956 | Mears et al. | 429/252 |
| 3,321,286 | 5/1967 | Clark et al. | 429/223 |
| 3,622,283 | 11/1971 | Sara | 428/367 |
| 4,132,828 | 1/1979 | Nakamura et al. | 428/378 |
| 4,330,602 | 5/1982 | O'Rell et al. | 429/251 |
| 4,338,132 | 7/1982 | Okamoto et al. | 419/24 |
| 4,353,686 | 10/1982 | Hosler et al. | 425/83.1 |

FOREIGN PATENT DOCUMENTS 0003874 1/1980 Japan ................ 427/397.8

*Primary Examiner*—Allan M. Lieberman
*Attorney, Agent, or Firm*—William H. Calnan

[57] ABSTRACT

A process for the production of a reinforced metal plate comprising forming a slurry of metal coated carbon fibers, binder fibers and metal powder, laying down a mat from said slurry, drying the resultant mat and then sintering said, is disclosed. The dried sintered mat may be made stronger by contacting the mat with a silicate before sintering.

13 Claims, No Drawings

REINFORCED METAL SUBSTRATE

CROSS-REFERENCE TO RELATED APPLICATION

This application is a continuation-in-part of my co-pending application, Ser. No. 531,364, filed Sept. 9, 1983, now abandoned and entitled REINFORCED NICKEL SUBSTRATE.

BACKGROUND OF THE INVENTION

Plates useful in the production of batteries such as nickel-cadmium batteries are conventionally produced from plaques of sintered nickel powder incorporating a variety of types of conductive mesh. The plaques normally are impregnated with nitrate solutions which are electrolytically converted into the active nickel and cadmium compounds. As the plaque material does not significantly enter into the battery reaction, it is desirable to minimize the weight of this material. Typically, the plaque is 70–80% porous before impregnation, the maximum porosity being limited by strength and electrical conductivity considerations. These batteries, in the past, have suffered primarily from the increased weight which results from attempts to strengthen the battery components so as to render them useful.

Therefore, if very lightweight metal structures having high electrical conductivity and chemical resistance in an electrolytic application could be formed, the weight now limiting the commercial applicability of such devices as nickel-cadmium batteries, fuel cells etc. could be lessened, thereby solving a long-felt need and constituting an advance in the art.

SUMMARY OF THE INVENTION

Reinforced metal substrates prepared from metal coated fibers and metal powder have been produced employing a fibrillated fiber as the binder material. The metal coated carbon fibers and metal powder are uniformly dispersed as a slurry, drawn down into a random non-woven web, and then sintered into a low cost, lightweight, highly conductive mat, especially when a silicate is present before sintering, suitable for forming into devices requiring electrical conductivity.

DESCRIPTION OF THE INVENTION INCLUDING PREFERRED EMBODIMENTS

The present invention relates to a process for the production of a conductive, reinforced metal substrate comprising forming a slurry of a mixture of metal coated carbon fibers, fibrillated binder fibers and metal powder, the amount of binder fibers ranging from about 1–15%, by weight, based on the total weight of slurry solids and the amount of metal coated carbon fibers to metal powder ranging from about 5:95 to 95:5, respectively, preferably 30:70 to 70:30 respectively, laying the mixture of fibers and powder down from said slurry as a random non-woven web, drying the resultant web and sintering.

The metal coated carbon fibers useful in the process of the present invention to produce the reinforced substrates are well known in the art as are methods for their production. For example, U.S. Pat. Nos. 3,622,283 and 4,132,828 are exemplary of procedures for their production.

The carbon fibers can be prepared from such carbon fiber precursors as coal tar pitch, petroleum pitch, coal tar, petroleum derived thermal tar, ethylene tars, high-boiling coal tar distillates, ethylene tar distillates, gas oils or polynuclear aromatics. Also useful as precursors are polymers such as acrylonitrile homopolymers and co-polymers, polyvinylalcohol, and natural and regenerated cellulose. Methods for preparing carbon fibers useful herein are disclosed in U.S. Pat. Nos. 4,069,297 and 4,285,831, which patents are hereby incorporated herein by reference.

The carbon fibers can be of any length although for practicality they should be less than about 15 mm in length. Preferably, and in order to achieve even further uniformity in the substrates, the length of the majority of the metal coated carbon fibers should not exceed about 3 mm. Most preferably, the fiber length of the metal coated carbon fibers should not exceed about 2 mm.

The binder fiber, used in amounts ranging from about 1% to about 15%, by weight, based on the total weight of slurry solids, can comprise any fibrous material capable of being fibrillated. For example, cellulosic fibers, acrylic fibers, polyester fibers and the like may be used. These fibers may be fibrillated in accordance with art recognized procedures such as for example, high speed shearing. The binder may also be of any practical length, however it is preferred that they not exceed 15 mm.

The preferred binder fibers are those capable of fibrillation which are decomposed upon sintering i.e. will substantially disintegrate upon heating to temperatures ranging from about 600° C. to about 800° C. Thus, preferred binder fibers are acrylic fibers produced from homopolymers and copolymers of acrylonitrile.

The metals used to coat the carbon fibers include nickel, zinc, silver, lead, cadmium, iron and the like. The same metal which is used to coat the carbon fibers should be used as the powder component when preparing the novel webs of the present invention.

The metal powder, used in the amounts set forth above, should have a particle size of not greater than 10 microns, and preferably from about 2 to about 4 microns.

The substrates are produced by laying down the mixture of fibers and metal powder from a slurry thereof. The slurry may be in a liquid such as water or in a gas such as air. That is to say, the web may be laid-down by using a wet-laying process (paper-making process) or a dry-layer process, i.e. from an air suspension onto a foraminous belt with the aid of a vacuum applied from below the belt as is known in the art, see U.S. Pat. No. 4,353,686.

Once prepared, the substrates are dried and then are sintered, as mentioned above. Sintering can be achieved at temperatures ranging from 700° C. to 1100° C., under compression and in humidified hydrogen. Sintering decomposes the binder fiber leaving contamination-free surfaces which further facilitates the sintering operation.

In order to strengthen the substrates, it is preferred to coat, dip, immerse or otherwise contact the dried substrate with a silicate such as sodium silicate and the like. Generally, from about 2 to about 20%, by weight, of silicate, based on the total weight of the substrate, is used.

The conductive, reinforced metal substrates produced by the process of the present invention have a wide variety of uses. They are useful as components in electrolyte cells employing basic electrolytes i.e. batteries; fuel cells and the like.

The following examples are set forth for purposes of illustration only and are not to be construed as limitations on the present invention except as set forth in the appended claims. All parts and percentages are by weight unless otherwise specified.

EXAMPLE 1

To a suitable blending apparatus are added 1.5 parts of acrylic fiber pulp, 1.5 parts of nickel powder having a particle size of about 3 microns, 300 ml. of water, 0.2 ml of a 10% solution of a commercially available surfactant and 0.2 ml of an 0.5% mixture of a commercially available flocculating agent. The slurry is blended for about 10 seconds and 1.5 parts of one-quarter inch, nickel plated carbon fiber are added, followed by blending for 20 seconds.

The resultant slurry is then drawn down into a sheet using a conventional hand sheet-making machine. The resultant sheet is rolled between blotter paper to remove excess water before drum-drying at 115° C. The dried sheet is then sintered at 800° C. in a hydrogen atmosphere for one hour under light compression and cooled to room temperature. The resultant substrate is sintered at the intersections of the nickel coated fibers, at which intersections the majority of the nickel powder is accumulated.

EXAMPLE 2

The procedure of Example 1 is again followed except that the dried sheet is soaked in a 10% aqueous solution of sodium silicate for about 2 minutes and then dried in an oven at 95° C. for twenty minutes before sintering. The resultant substrate exhibits more strength and rigidity than the product of Example 1.

EXAMPLE 3

The procedure of Example 2 is again followed except that the acrylic fibers are replaced by cellulosic fibers. Similar results are obtained.

EXAMPLE 4

The substrate of Example 1 is impregnated with active materials and converted to the hydroxides required for a nickel-cadmium battery application using the process of R. L. Beauchamp, Electrochemical Society Meeting, Extended, Abstracts #65, October 1970, pp 161 and later refined by D. F. Pickett, "Fabrication and Investigation of Nickel-Alkaline Cells", Part I, AFAPL-TR-75-34, 1974 at the air force Astro-Propulsion Laboratory. The substrate is placed between two nickel electrodes in a holding frame so that the substrate does not contact either electrode, the frame is submerged in a 50/50 water-ethanol solution containing 1.8 molar nickel nitrate and 0.2 molar cobalt nitrate. The substrate is cathodized at 0.5 amperes/in$^2$ for a period of about 2 hours. Next the substrate is removed from the solution, washed in deionized water and placed in a 3.5 wt 0/0 potassium hydroxide solution. Cathodization of the substrate is performed at 0.5 amperes/in$^2$ for 20 minutes and the polarity is reversed and the substrate is anodized using the same current-time schedule. This process of cathodization and anodization is repeated several times after which the substrate is washed in deionized water, dried and cut up into plates. The resultant nickel battery plates are assembled into nickel-cadmium cells using a matching number of commercial cadmium plates and nylon woven separator. The result is an excellent battery.

EXAMPLE 5

The procedure of Example 1 is again followed except that the carbon fiber is zinc plated and zinc metal is used. When formed into a plate and used in a battery as in Example 4, excellent results are achieved.

EXAMPLE 6

When the procedures of Examples 1 and 4 are again followed except that the carbon fibers are silver plated and silver powder is employed, an excellent battery results.

EXAMPLE 7

Replacing the nickel coating and nickel powder of Example 1 with lead and forming the resultant substrate into a battery as in Example 4 achieves excellent results.

EXAMPLES 8 & 9

Following the procedure of Example 1, except that the nickel is replaced by (8) cadmium and (9) iron, excellent results are achieved.

We claim:

1. A process for the production of a reinforced metal substrate which comprises
   (a) forming a slurry of a mixture of metal coated carbon fibers, fibrillated binder fibers and metal powder, the ratio of metal coated carbon fibers to metal powder ranging from about 95:5-5:95, respectively, the metal powder and the metal on the carbon fibers being identical,
   (b) laying the fibrous mixture down from said slurry as a random non-woven web,
   (c) drying the laid-down web, and
   (d) sintering the resultant dried web.

2. A process according to claim 1 wherein the binder fibers are cellulosic fibers.

3. A process according to claim 1 wherein the binder fibers are acrylic fibers.

4. A process according to claim 1 wherein the dried web is contacted with a silicate before sintering.

5. A process according to claim 1 wherein the metal is nickel, zinc, silver, lead, cadmium or iron.

6. A web comprising a dry, sintered sheet of a mixture of metal coated carbon fibers and metal powder, the ratio of metal coated carbon fibers to metal powder ranging from about 95:5 to 5:95, respectively, said web being the product of the process of claim 1.

7. A web in accordance with claim 6 wherein the dry, sintered sheet contains a silicate.

8. The web of claim 6 in the form of a battery plate.

9. A web in accordance with claim 6 wherein the metal is nickel, zinc, silver, lead, cadmium or iron.

10. The process of claim 1 wherein the binder fiber comprises from about 1% to about 15%, by weight, based on the total weight of slurry solids.

11. The process of claim 1 wherein the particle size of the metal powder is not greater than 10 microns.

12. A web comprising a dry sheet of a mixture of metal coated carbon fibers, fibrillated binder fibers and metal powder, the ratio of metal coated carbon fibers to metal powder ranging from about 95:5 to 5:95, respectively, the metal powder and the metal on the carbon fibers being the same.

13. The web of claim 12 further comprising a silicate.

* * * * *